United States Patent Office 3,652,521
Patented Mar. 28, 1972

3,652,521
LATENTLY REACTIVE COMPOSITION REACTABLE UNDER INFLUENCE OF MOISTURE AND ITS METHOD OF PREPARATION AND USE
Thomas Abend, Rapperswil, Switzerland, assignor to Gurit AG, Richterswil, Switzerland
No Drawing. Filed Aug. 29, 1969, Ser. No. 854,282
Claims priority, application Switzerland, Sept. 4, 1968, 13,265/68
Int. Cl. C08f 3/64, 15/18
U.S. Cl. 260—86.1         16 Claims

ABSTRACT OF THE DISCLOSURE

A composition of matter containing a monomer wherein the monomer may be caused to form a polymer at some time in the future without the necessity of adding any additional ingredients to the composition. Polymerization is caused by exposing the composition to moisture. Essentially, the presence of the moisture results in a free-radical reaction wherein certain radicals cause the monomer to undergo a polymerization reaction. The novel composition of this invention comprises (1) at least one liquid material polymerizable under the action of radicals, (2) at least one initiator system causing the formation of radicals under the influence of surrounding moisture, and (3) a drying agent. Certain optional ingredients such as fillers, surface active agents and the like may also be added.

BRIEF SUMMARY OF THE INVENTION

This invention relates to a latently reactive composition which is highly stable containing a monomer which may be caused to polymerize without the addition of any additional ingredients thereto. In addition, this invention relates to a method of preparing these novel compositions. Consistent with this invention, the novel compositions may be employed as adhesives, for the manufacture of floor surfacing compositions, coatings, repair putties, as castings, and as sealants, road markings, for repairing concrete, as a filler for tooth cavities and the like.

BACKGROUND OF THE INVENTION

It is known that inorganic peroxides, such as barium peroxide, calcium peroxide or sodium peroxide, act like inert substances when moisture is excluded. Under the influence of moisture, hydrogen peroxide is then formed in known manner.

It is also known that certain intermediate products are formed having a radical structure which occur during the reaction of hydrogen peroxide with numerous reducing agents as well as during the catalytic decomposition of hydrogen peroxide by means of certain metallic ions. These intermediate products are then able to accelerate or catalyze polymerization reactions.

An example of the above-described redox reactions is the conversion of hydrogen peroxide with the bivalent ferrous iron which takes place as follows:

$$H_2O_2 + Fe^{2+} \rightarrow HO\cdot + OH^- + Fe^{3+}$$

$$HO\cdot + Fe^{2+} \rightarrow HO^- + Fe^{3+}$$

$$HO\cdot + Monomers \rightarrow \rightarrow \rightarrow Polymer$$

For example, the following reactions also occur during the catalytic decomposition of hydrogen peroxide when acted upon by certain metallic ions:

$$HOOH + Co^{2+} \xrightarrow{rapid} HO\cdot + OH^- + Co^{3+} \quad (1)$$

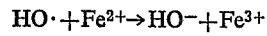

$$HOOH + Co^{3+} \xrightarrow{slow} HOO\cdot + H^+ + Co^{2+} \quad (2)$$

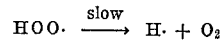

$$HOO\cdot \xrightarrow{slow} H\cdot + O_2 \quad (3)$$

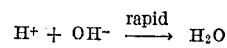

$$H^+ + OH^- \xrightarrow{rapid} H_2O \quad (4)$$

These reactions can be accelerated by promoters, such as N,N-dialkylanilines, mercaptans, reducing sugars or enolizable compounds as well as by changing the basicity of the system. In this manner, the reduction of the trivalent catalytically less active cobalt to active divalent cobalt can be influenced in particular. This permits the control of the speed of polymerization reactions by combining various accelerators and promoters within very large ranges.

The experiments upon which the invention is based have shown that mixtures of low or high molecular weight compositions which are able to polymerize according to radical mechanisms and of extremely water-free inorganic peroxides, metallic accelerators and promoters under water-free conditions are surprisingly stable and can be stored for longer periods of time without the components of the composition losing their reactivity. However, if these mixtures are exposed to the influence of moisture, for example, moisture derived from the amtosphere or from substrates, then polymerization begins. The following reactions among others then take place:

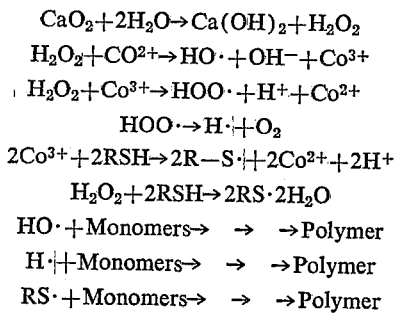

$$CaO_2 + 2H_2O \rightarrow Ca(OH)_2 + H_2O_2$$

$$H_2O_2 + Co^{2+} \rightarrow HO\cdot + OH^- + Co^{3+}$$

$$H_2O_2 + Co^{3+} \rightarrow HOO\cdot + H^+ + Co^{2+}$$

$$HOO\cdot \rightarrow H\cdot + O_2$$

$$2Co^{3+} + 2RSH \rightarrow 2R-S\cdot + 2Co^{2+} + 2H^+$$

$$H_2O_2 + 2RSH \rightarrow 2RS\cdot 2H_2O$$

$$HO\cdot + Monomers \rightarrow \rightarrow \rightarrow Polymer$$

$$H\cdot + Monomers \rightarrow \rightarrow \rightarrow Polymer$$

$$RS\cdot + Monomers \rightarrow \rightarrow \rightarrow Polymer$$

In the above formulas R stands for alkyls, especially a higher alkyl.

OBJECTS OF THE INVENTION

It has been discovered that the novel compositions of this invention possess valuable properties. When the novel compositions are exposed to moisture, a polymerization reaction takes place. Thus, the compositions are particularly valuable for its use as an adhesive, manufacture of floor surfacing compositions, repair putties, sealants, road markings and the like.

A primary object of the present invention is to provide a composition which is a latently reactive mixture which may be polymerized when subjected to moisture.

An important further object of the present invention is to provide a composition which is highly stable and which may be caused to polymerize at some time in the future, without the need to add any additional ingredients.

It is also an object of this invention to employ the novel compositions as an adhesive.

A still further object is to employ the novel compositions of this invention as bonding agents for building materials.

Still another object of this invention is the use of the novel compositions in the bonding of concrete parts.

DETAILED DESCRIPTION OF THE INVENTION

The compositions which are latently reactive, stable in storage, and which polymerize without adding additional components under the influence of surrounding moisture, said compositions being inactive when moisture is excluded, comprise:

(A) At least one liquid material which is polymerizable under the action of radicals,
(B) At least one initiator system which causes the formation of radicals under the influence of surrounding moisture, and
(C) A drying agent.

The initiator system which is utilized as component B is a peroxide, the peroxide moiety of which is attached by an ionic bond, preferably an inorganic peroxide, an alkali metal peroxide and/or an alkaline earth metal peroxide. Suitable examples include barium peroxide, calcium peroxide and magnesium peroxide, which are added in amounts from 0.1 to 20 parts per total weight of the mixture. An accelerator may also be used together with the peroxide compounds. The accelerators contain metal ions. Particularly useful compounds include cobaltous and ferrous compounds.

Examples include cobaltousoctoate, cobaltousnaphthenate, ferrous naphthenate and the like, which are added in amounts from 0.01 to 5 percent by weight, expressed as metal by total weight of the mixture.

It is also frequently advantageous to add still another ingredient to the initiator component B such as a promoter for the accelerator. These promtors which are added in amounts from 0.01 to 5 percent by weight can be an amine, an enolizable compound, mercaptans, reducing sugars and the like. Examples of suitable amines include N,N-dialkylanilines (e.g. N,N-dimethylaniline) and N,N-dimethyl-p-toluidine. Suitable examples of enolizable compounds include ethylacetoacetate, diacetone alcohol, benzoin, ascorbic acid, acetylacetonates of metals, e.g. of cobalt or iron. Suitable examples of mercaptanes include alkylmercaptanes, preferably higher alkyl mercaptanes such as dodecylmercaptane or lauryl mercaptane. Suitable examples of reducing sugars include glucose and ascorbic acid.

The polymerizable liquid material A generally consists of monomers and/or prepolymers.

In order to ensure the stability of the compositions of this invention, it is necessary to remove any moisture present and to prevent the addition of moisture to the composition. This can be achieved preferably by incorporating a drying agent C into the composition. These drying agents are characterized by an extremely low equilibrium vapor pressure being in the range of $10^{-3}$ torr. Suitable examples include moleclular sieves, barium oxide, calcium carbide, and the like. The amount of drying agent being incorporated depends on the amount of free moisture inherent in the ingredients.

In addition to components A and B, the compositions of this invention can also contain other ingredients. Thus, it will be particularly advantageous in a great number of fields of application if the compositions contain an additional ingredient, a polymeric component D. Suitable examples of component D include, for example, polymeric compounds which are soluble in A. Another suitable example of component D is a polymeric compound which is copolymerizable with A or that component D may form a polymerizate of component A. That means that the component D shall be a polymer being soluble in the polymerizable monomer or mixtures thereof and compatible with the polymer formed by polymerisation of said monomer, respectively monomers. The highest degree of compatibility show dissolved polymers which can react with the monomers by copolymerisation such as unsaturated polyesters.

Since the presence of oxygen frequently exerts an unfavorable influence upon the sequence of the polymerization reactions, it is advantageous to prevent the oxygen from coming into contact with the composition and/or bind the oxygen, respectively. This simplest way to prevent the oxygen from diffusing into the composition is to add some paraffin to the mixture. It can also be advantageous to add as an additional ingredient to the composition an oxygen binding agent or reducing agent. A still further ingredient which may be incorporated into the compositions of this invention are fillers. The use of fillers in the composition is determined by the ultimate use of the composition. While a great number of different fillers may be employed in the practice of this invention, it is necessary that any filler employed must be added to the composition in a dry condition to the extent possible so that they will not enter into interferring reactions with the mixture to be polymerized or with the initiator system. The use of fillers in the compositions has a marked effect on the viscosity of the compositions. In addition, the use of fillers helps to control the polymerization reaction which will take place.

Of course, the novel compositions may also contain certain other optional ingredients, depending upon the intended use. These include surface active agents, dye pigments, bonding agents, foaming agents or polymerization inhibitors (e.g., hydroquinone).

PROCESS OF PREPARING THE NOVEL COMPOSITIONS OF THE INVENTION

The novel compositions of this invention are prepared by initially mixing component A intensively with the drying agent C. Thereafter, the initiator system B is added to the mixture of A and B.

One or more fillers may be added to the mixture of A, B and C. If a component D is used, it is advantageous to first dissolve the same in component A.

If one uses as component D a polymerizate of A, then one can either dissolve the polymer component D in the monomer component A or, alternatively, one can also produce a solution of D in A by the partial polymerization of A. The additional components which can be added to the mixture of components A, B and C, are suitably employed in a dry condition as far as possible and mixed by excluding moisture to the extent possible.

However, the presence of one or several drying agents also permits utilization of commercially available fillers and auxiliaries which can then be mixed without the necessity of a preliminary drying step. The components of the initiator system B are suitably added separately. It is also possible to add the previously dried fillers into the polymerizable material A and this mixture is then treated with a drying agent C. The mixture produced thereby is then stored for a short period of time during which the drying agent absorbs the residual moisture from the mixture. Thereafter, an inorganic peroxide is then added. The inorganic peroxide may also be added in combination with a plasticizer which renders this mixture pastry. A metal composition suitable as an accelerator is then added together with promoters, if desired.

The inventive mixtures are advantageously used as adhesive or bonding agents, casting, puttying or surfacing masses. What must particularly be stressed is the feasibility to utilize the mixtures as bonding agents for building materials. A further preferred example of application is the utilization of the compositions as a body solder of filler, especially for repair work in the automobile industry. In addition, the mixtures are suitable in the shape of casting or puttying masses for sealing joints, jointless floor coverings or road markings.

The reaction principle of moisture-induced polymerization, which is the basis of the invention, can be applied with particularly good results to acrylates and methacrylates, as well as to unsaturated polyesters dissolved in styrene.

The polymeric acrylates and methacrylates belong to the few polymers or copolymers which have good solubility in the corresponding monomers or monomer mixtures, respectively. This property permits the production of so-called acrylic syrups, i.e., solutions of 20 to 70 parts by weight polymers in 80 to 30 parts by weight monomers. The polymerization of these polymer-in-monomer mixtures usually takes place within the temperature range of 10 to 70° C., and in some cases, at −10° C. or in excess of 100° C. The production of the radicals which causes the polymerization takes place at the stated temperatures, in general, by means of redox reactions, for example, by means of the peroxide/Co$^{++}$ or dibenzoyl peroxide/diethylaniline systems. The polymerization products produced thereby, depending upon the selection of the monomers and polymerization conditions, are brittle glass, highly elastic masses, sticky putties or highly viscous oils.

The suitability of the monomeric acrylates or acrylic syrups for the formulation of moisture-hardening or vulcanizing products can be easily derived from the description made above and what has been made known heretofore. The simplest applications of the compositions of this invention are hard mixtures which can be used as casting masses, industrial surface coatings, self-levelling floor coverings or repair puttys in the construction or as body solders in the automobile industry and which can also be used as one component bonding agent in the construction industry.

The materials initially employed in each case as well a sthe selected polymerization conditions are dependent upon the intended function of the compositions. Materials, which are particularly suitable as the initial materials for the intended purpose of use in a given case are polymerizates and mixed polymerizates of the following monomers:

| Monomer | Glass transition temperature of the corresponding polymer, ° C. |
|---|---|
| Methylmethacrylate | 105 |
| Butylmethacrylate | 20 |
| Ethylhexylmethacrylate | −5 |
| Methylacrylate | 8 |
| Ethylacrylate | −22 |
| Butylacrylate | −54 |
| Ethylhexylacrylate | −85 |

Further suitable monomers are ethylenically unsaturated monomers such as vinyl radical containing compounds for example styrene, divinylbenzene, vinyltoluene, acrylonitrile, vinylesters, e.g. vinylacetate, vinylpropionate; esters of unsaturated fatty acids; fumaric and maleic acid esters, and mixtures thereof; and mixtures with monomers generally not homopolymerizable by radical mechanism at room temperature, such as maleic anhydride, diallylphthalate and triallyl cyanurate.

According to the reactive principle upon which the invention is based, the following variants can also be utilized.

(A) An elastomeric polyacrylate without cross-linkage which has been produced by emulsion, suspension or solvent polymerization, is dissolved in the suitable quantity of monomer. Fillers and the moisture-reactive initiator system are then added. The mass which is extrudable at room temperature is filled into impervious receptacles.

Under the influence of moisture, polymerization of the monomer which acts as solvent takes place by simultaneous partial cross-linkage of the material due to the abstraction reactions at the α-C-atom, especially as a result of the very reactive ·OH— radicals and/or by polyfunctional monomers which have been added in concentration of several mol percent.

(B) The monomer mixture may also be polymerized at a low temperature with a redox system up to its point of conversion into a polymer which corresponds to the beginning of the gel point. The reaction is then stopped by interrupting the feeding of the peroxide and by adding a small amount of an inhibitor.

Fillers are then added together with small quantities of functional monomers and the moisture-reactive initiator system B and packed as above.

Cross-linkage takes place by abstraction reactions and polyfunctional monomers. The gel point can be varied by adding polyfunctional monomers, by adding a little solvent having a high chain transfer constant or regulators such as mercaptans.

(C) The polymer dissolved in the monomer carries several mol percent groups which are capable of copolymerization with the polymer acting as solvent.

In addition, the principle of moisture-induced polymerization can be applied advantageously to unsaturated polyesters. The end products obtained hereby are mostly rigid, non-elastic materials which are especially suitable for their utilization as surfacings (or coatings), body solders or fillers or casting masses and for the manufacture of floor coverings.

If acrylates and methacrylates are employed, a particular problem is presented in inhibiting the oxygen in carrying out the polymerization reaction. The various methods of binding the oxygen have already been described hereinbefore.

A still further important problem is the selection of the particular fillers to be employed. In those cases where high compressive strength is very important, as for example, in producing floor coverings, mineral powders such as quartz powder or quartz sand and precipitated carbonates are used as fillers. The filler content can amount up to approximately 300 volume percent filler in relation to the liquid phase.

The selection of the filler mixtures is particularly critical when dealing with the production of repair putties and fillers since the material must be able to be sprayed, yet it must be of a sufficient viscosity so as not to run off the surface, it must be able to be ground and polished well, the surface must also have a high impact-resistance, adhere well to surfaces and be able to have a lacquer applied on top of it.

Thus, a repair filler can be produced, for example, on the basis of unsaturated polyesters which contains as initiator system the combination of an inorganic peroxide, metal accelerator, and amine, as the promoter.

The manufacture of such a spray-body solder takes place in such manner that in the closed mixer the fillers which are dried, if desired, are worked into the given liquid components. Thereafter, the drying agent is added and after a short mixing, the mixture is filled into a storage receptable, (e.g., a container or vessel). During the storage which lasts from one to two days, the drying agent extracts the residual moisture from the mixture. An inorganic peroxide is then added together with an accelerator and promoters which are distributed by means of a stirrer or by rolling the vessel or container.

The end product is a moderately viscous paste which can be applied with a gun. During spraying, a portion of the styrene which acts as solvent evaporates, thus causing the viscosity of the composition to increase. This increased viscosity prevents the material from running off vertical surfaces. At the same time, moisture is taken up from the atmosphere which starts the chain reaction. The hardening can be accelerated by heating after application, for example, in a tunnel oven or by means of an infrared heater.

The storage stability also lasts several months.

If the proportion of filler is increased, the result is a moisture-reactive knife-filler, which can also be used in the construction industry as repair mass, for example, for concrete.

Non-thixotropic masses having hard, chemically inert fillers are suitable as floor coverings.

ILLUSTRATIVE EXAMPLES

The invention will be described in greater detail by referring to the following examples. The data used for parts and percentages, respectively refer to units of weight unless otherwise stated.

EXAMPLE I

One mixes by means of a high speed mixer or agitator 180 parts of an air-drying polyester resin. 90 parts of an amine-containing polyester resin and 130 parts styrene with a mixture of 240 parts powdered talcum which has been dried over a period of 24 hours at 120° C., 180 parts barite (i.e., natural barium sulfate), 80 parts lithopone (i.e., zinc sulfide white) 50 parts precipitated calcium carbonate, 50 parts titanium dioxide and 5 parts of a fumed silica until there is obtained a homogeneous distribution of all the fillers. Into this mixture, a pasty mixture of 30 parts powdered barium peroxide and 5 parts powdered water-free molecular sieves in 10 parts tricresylphosphate is then added while stirring and, finally, 2 parts cobaltoctoate (2% metal contents) in 5 parts tricresylphosphate is then added.

By excluding moisture, this mixture can be stored for at least two months without loss of reactivity. Using it as spray body solder, it is applied to the substratum with a spray gun where it hardens within a few hours into a surface which can be sanded dry or wet.

EXAMPLE II 10 parts polymeric methylmethacrylate are dissolved by stirring, at room temperature, in 20 parts monomeric methylmethacrylate. To this solution, there are added one part monomeric ethyleneglycoldimethacrylate, 0.3 parts paraffin with a melting point of 52 to 54° C., 0.2 part N,N-dimethyl-p-toluidine and 0.4 part of cobaltnaphthenate (in dioctylphthalate, metal content 2%).

Thereafter, while stirring the mixture at a high speed, in this liquid phase 20 parts quartz powder, 5 parts talcum 5 parts precipitated calcium carbonate, 2 parts titanium dioxide, 2 parts fumed silica and 0.3 parts molecular sieve powder are added to the liquid phase. Prior thtereto, these fillers have been dried over a period of 12 hours at 150° C.

Finally, a master batch of 2 g. calciumperoxide powder and 0.5 molecular sieve powder in 4 parts tricresylphosphate are added. This pasty mixture can be stored in the absence of any moisture, but it hardens within a few hours if it is placed between the surfaces of concrete. After the bonding agent reaches its final strength, a cohesive failure occurs in the concrete, when subjected to stress up to the breaking point.

EXAMPLE III 70 parts of polymeric butylacrylate are dissolved in 25 parts of monomeric butylacrylate by stirring. Thereafter, 5 parts ethyleneglycoldimethacrylate, 0.5 parts N,N-dimethyl-p-toluidine, 1 part benzoin and 3 parts iron naphthenate in butylbenzylphthalate (1% metal contents) are then added.

By excluding moisture, 2 parts molecular sieve powder, 15 parts precipitated calcium carbonate, 20 parts talcum, 2 parts finely ground asbestos fibers and 2 parts fumed silica are worked into the mixture in a kneader. Lastly, 7 parts of pulverized barium peroxide are added to the mixture. The resulting pasty mass can then be stored over a longer period of time without a decrease in its reactivity.

If this mass is poured into a joint, the mixture hardens within a few days into an elastic mass.

EXAMPLE IV

The following pigments are worked into 50 parts monomeric methylmethacrylate: 35 parts water-free calcium sulfate, 35 parts of zinc oxide, 15 parts of precipitated calcium carbonate 15 parts of precipitated calcium silicate, 15 parts of precipitated silicic acid, and 5 parts fumed silica. All of these fillers were first dried for a period of 10 hours at 120° C. After homogenization in the porcelain ball mill, the following ingredients are then added: 7 parts ethyleneglycoldimethacrylate, 5 parts methacrylamide, 1 part dimethylaniline, 2 parts cobalt naphthanate (2% metal contents), 5 parts molecular sieve powder and 5 parts barium peroxide powder.

This pasty mixture which can be stored by excluding moisture can be used as tooth cement. When inserting it into tooth cavities, the moisture present therein causes hardening.

Having now discussed in considerable detail illustrative and preferred embodiments of the invention, it should be apparent that the objects set forth at the outset of this specification have been satisfied. Accordingly,

What is claimed is:

1. A composition of matter consisting essentially of
   (A) at least one liquid ethylenically unsaturated monomer polymerizable in the presence of hydrogen peroxide;
   (B) at least one inorganic metal peroxide polymerization catalyst selected from the group consisting of alkali metal peroxides and alkaline earth metal peroxides and which under the influence of surrounding moisture causes the formation of free radicals and which is inert in the absence of moisture, said inorganic peroxide being present in an amount sufficient to catalyze the polymerization of said monomer at ambient temperature upon the formation of free radicals; and
   (C) a drying agent possessing a low equilibrium pressure; such composition of matter being inactive when moisture is excluded, stable in storage, and polymerizable when exposed to surrounding moisture without the aid of additional components and without the aid of external heat.

2. A method of producing a composition of matter comprising the steps of:
   (A) providing at least one liquid ethylenically unsaturated monomer polymerizable in the presence of hydrogen peroxide;
   (B) then mixing the material of step (A) with a drying agent possessing a low equilibrium vapor pressure; and
   (C) thereafter adding to the mixture of step (B) at least one inorganic metal peroxide polymerization catalyst selected from the group consisting of alkali metal peroxides and alkaline earth metal peroxides and which under the influence of surrounding moisture causes the formation of free radicals and which is inert in the absence of moisture, said inorganic peroxide being present in an amount sufficient to catalyze the polymerization of said liquid material of step (A) at ambient temperature upon the formation of free radicals;
   such method producing a composition of matter which is inactive when moisture is excluded, stable in storage and polymerizable when exposed to surrounding moisture without the aid of additional components and without the aid of external heat.

3. A composition of matter consisting essentially of
   (A) liquid material polymerizable in the presence of hydrogen peroxide, said liquid material being a mixture containing a major amount of (1) a monoalkylacrylate or a monoalkylmethacrylate and a minor amount of (2) a diacrylate or a dimethacrylate;
   (B) at least one inorganic metal peroxide polymerization catalyst selected from the group consisting of alkali metal peroxides and alkaline earth metal peroxides and which under the influence of surrounding moisture causes the formation of free radicals and which is inert in the absence of moisture, said inorganic peroxide being present in an amount sufficient to catalyze the polymerization of said mixture (A) at ambient temperatures upon the formation of free radicals; and
   (C) a drying agent possessing a low equilibrium pressure in the range of $10^{-3}$ torr;
   such composition of matter being inactive when moisture is excluded, stable in storage, and polymerizable when exposed to surrounding moisture without the aid of additional components and without the aid of external heat.

4. A method for producing a composition of matter consisting essentially of the steps whereby
(A) a liquid material polymerizable in the presence of hydrogen peroxide is provided, said liquid material being a mixture containing a major amount of (1) a monoalkylacrylate or a monoalkylmethacrylate and a minor amount of (2) a diacrylate or a dimethacrylate;
(B) then mixing the material of step (A) with a drying agent possessing a low equilibrium vapor pressure, in the range of $10^{-3}$ torr;
(C) thereafter adding to the mixture of step (B) at least one inorganic metal peroxide polymerization catalyst selected from the group consisting of alkali metal peroxides and alkaline earth metal peroxides and which under the influence of surrounding moisture causes the formation of free radicals and which is inert in the absence of moisture, said inorganic peroxide being present in an amount sufficient to catalyze the polymerization of said mixture of step (A) at ambient temperature upon the formation of free radicals;
such method producing a composition of matter which is inactive when moisture is excluded, stable in storage, and polymerizable when exposed to surrounding moisture without the aid of additional components and without the aid of external heat.

5. A composition of matter according to claim 1 wherein the component (B) additionally contains an accelerator containing metal ions.

6. A composition of matter according to claim 5 wherein the accelerator is a cobaltous compound.

7. A composition of matter according to claim 5 wherein the accelerator is a ferrous compound.

8. A composition of matter according to claim 5 wherein the component (B) further contains at least one promoter selected from the group consisting of amines, enolizable compounds, and mixtures thereof.

9. A composition of matter according to claim 8 which further contains as an additional ingredient, a polymeric component D which is soluble in and compatible with component A.

10. A composition of matter according to claim 9 wherein the component D is a polymerizate of component A.

11. A composition of matter according to claim 1 wherein the drying agent C is selected from the group consisting of barium oxide, calcium oxide, calcium carbide, and molecular sieve.

12. A composition of matter according to claim 1 which further contains a filler as an additional ingredient.

13. A method according to claim 2 which further comprises the step of adding at least one filler to the composition.

14. A method according to claim 2 which further comprises the step of adding a polymeric component D which is soluble in and compatible with component A and thereafter adding a filler to the composition.

15. A method according to claim 14 which further comprises the step of drying the filler at increased temperatures prior to mixing said filler with the components of the mixture of step (C) and the polymeric component D.

16. A method according to claim 2 further including the step of stabilizing the system through the addition of a free radical inhibitor.

References Cited

UNITED STATES PATENTS

| | | | |
|---|---|---|---|
| 2,559,345 | 7/1951 | Church et al. | 260—89.5 |
| 2,628,225 | 2/1953 | Tutwiler | 260—89.5 A |
| 2,779,751 | 1/1957 | Bredereck et al. | 260—89.5 A |
| 3,255,162 | 6/1966 | Beavers et al. | 260—85.5 L |
| 3,290,410 | 12/1966 | Bader et al. | 260—89.5 |
| 3,410,719 | 11/1968 | Roper | 260—11/68 |
| 3,479,246 | 11/1969 | Stapleton | 260—11/69 |
| 3,403,136 | 9/1968 | Baker | 260—86.1 R |
| 3,427,290 | 2/1969 | Naka Gawa et al. | 260—86.1 R |
| 3,474,461 | 10/1969 | Otsu et al. | 260—86.1 R |

OTHER REFERENCES

R. J. Neddenriep (Linde Div., Union Carbide Corp., New York, N.Y.). Adhesives Age 9(6), 23–9 (1966) (Eng).

HARRY WONG, Jr., Primary Examiner

U.S. Cl. X.R.

117—161; 260—2.5, 41, 78.4, 78.5, 80.81, 85.5, 85.7, 88.1, 88.7, 89.1, 89.5, 93.5, 885